No. 623,868. Patented Apr. 25, 1899.
J. A. BELLON-LENCAUCHEZ.
GAS PRODUCER.
(Application filed Dec. 23, 1897.)
(No Model.)
5 Sheets—Sheet 2.

WITNESSES:

INVENTOR
BY
ATTORNEYS.

No. 623,868. Patented Apr. 25, 1899.
J. A. BELLON-LENCAUCHEZ.
GAS PRODUCER.
(Application filed Dec. 23, 1897.)
(No Model.) 5 Sheets—Sheet 3.

No. 623,868. Patented Apr. 25, 1899.
J. A. BELLON-LENCAUCHEZ.
GAS PRODUCER.
(Application filed Dec. 23, 1897.)

(No Model.) 5 Sheets—Sheet 4.

WITNESSES:

INVENTOR

BY

ATTORNEYS.

No. 623,868. Patented Apr. 25, 1899.
J. A. BELLON-LENCAUCHEZ.
GAS PRODUCER.
(Application filed Dec. 23, 1897.)
(No Model.) 5 Sheets—Sheet 5.

UNITED STATES PATENT OFFICE.

JAMES ALEXANDRE BELLON-LENCAUCHEZ, OF PARIS, FRANCE.

GAS-PRODUCER.

SPECIFICATION forming part of Letters Patent No. 623,868, dated April 25, 1899.

Application filed December 23, 1897. Serial No. 663,231. (No model.)

*To all whom it may concern:*

Be it known that I, JAMES ALEXANDRE BELLON-LENCAUCHEZ, of Paris, (Seine,) Republic of France, have invented certain new and useful Improvements in Apparatus for Generating Gas, which are fully described in the following specification.

This invention relates to apparatus for generating or producing gas for illuminating or other purposes.

The principal objects thereof are to utilize to the best advantage the heat resulting from the combustion of the fuel for the purpose of heating the air and also the water from which said air receives its moisture before passing upwardly through the burning fuel, and, further, to regulate the supply of air and the quantity of vapor or moisture taken up thereby, not only with relation to each other, but in proportion to the quantity of gas generated by the apparatus. With these objects in view my apparatus has for its principal features a reservoir for water, located under the grate and having inclined walls, whereby the surface area of the water, and consequently the amount of vapor taken up by the hot air in passing thereover, varies with the quantity of water supplied to the said reservoir, a conduit arranged contiguous to the combustion-chamber for conducting the water to the reservoir, the water being preliminarily heated in said conduit, means associated with said water-conduit whereby the reservoir may be filled to a predetermined but adjustable level, an air-conduit leading through chambers in the walls of the combustion-chamber, whereby the air may be preliminarily heated before it passes over the surface of the water in the reservoir and upwardly through the burning fuel, and means for controlling the supply of air to said conduit in the proper quantity.

The invention will be best understood by reference to the accompanying drawings, wherein—

Figure 1:
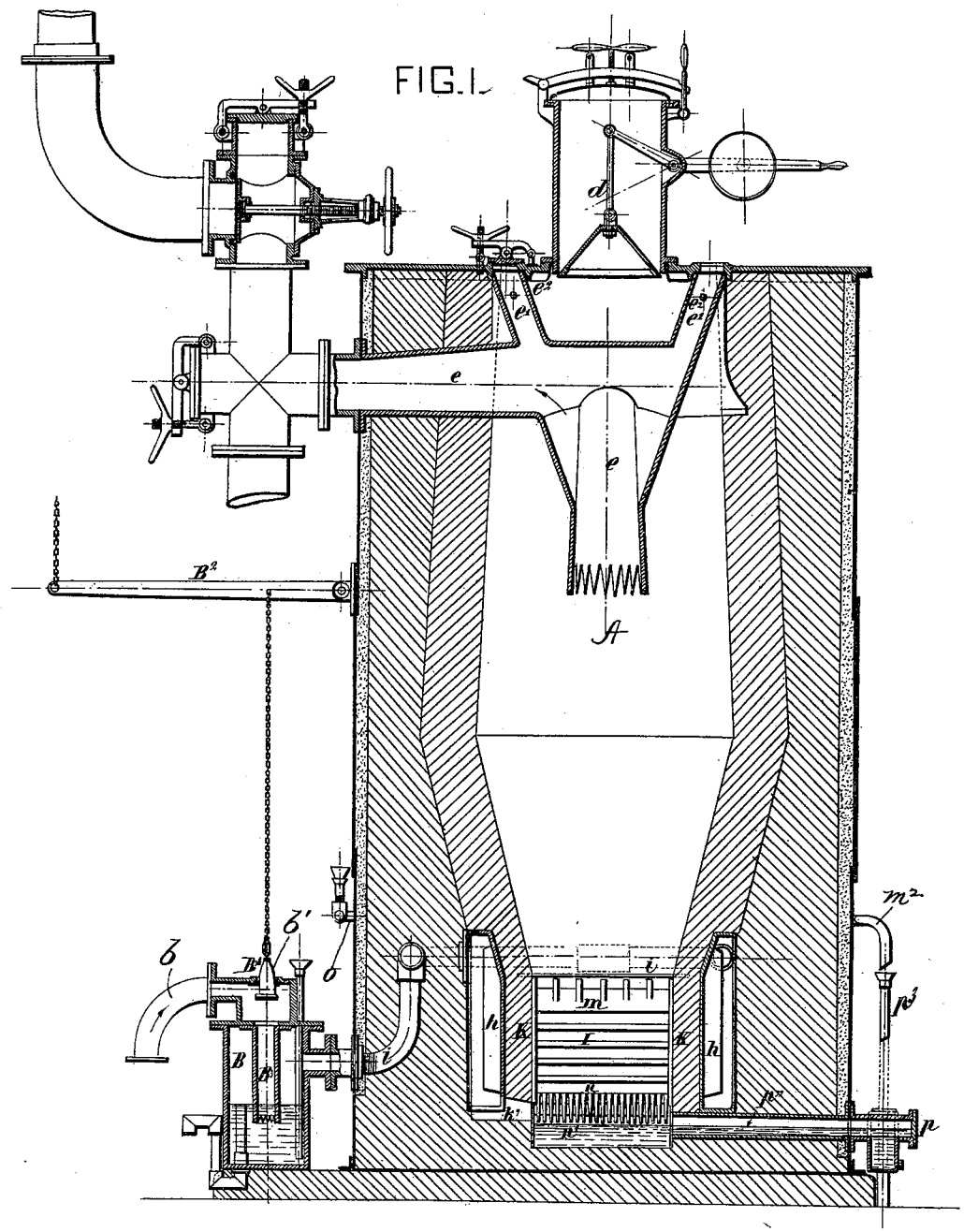
Figure 2:
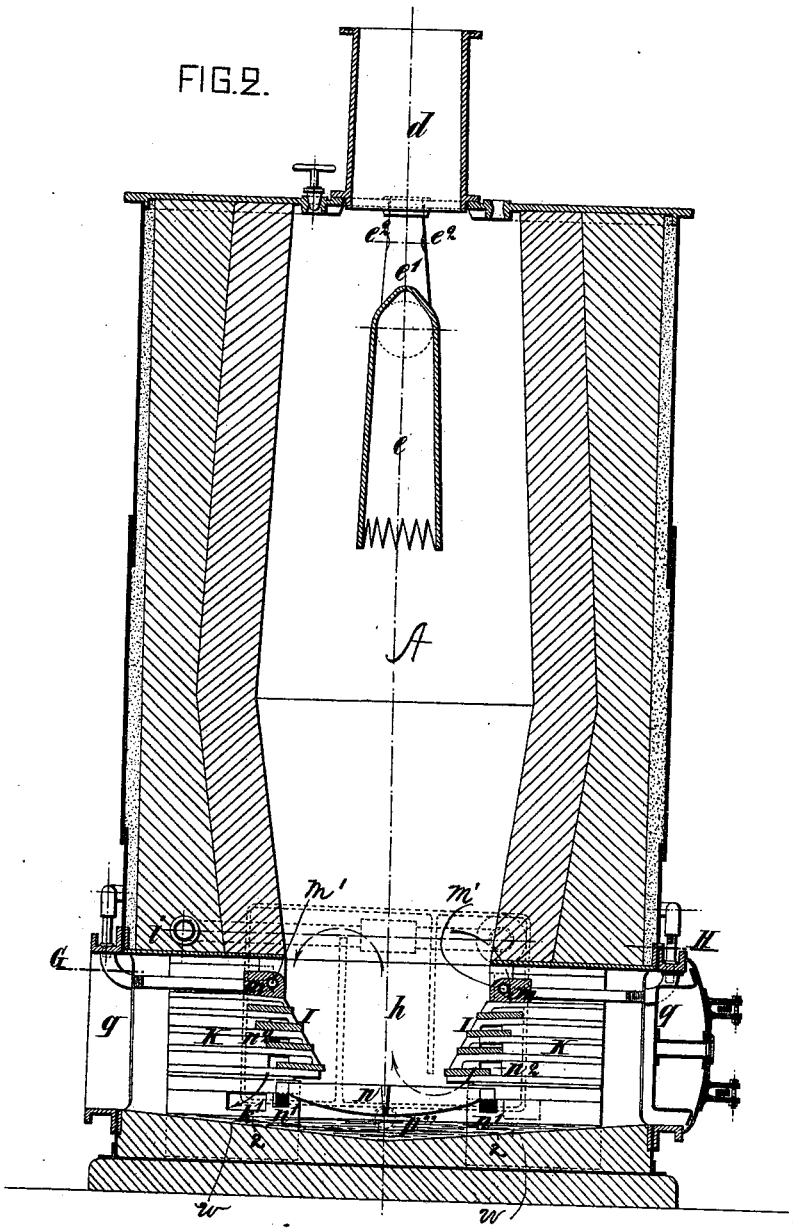
Figure 3:
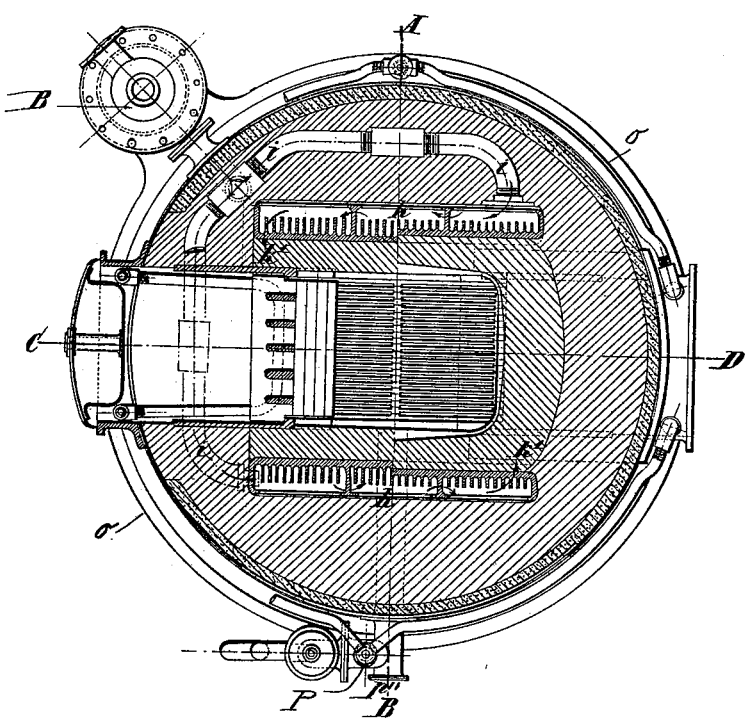
Figure 4:
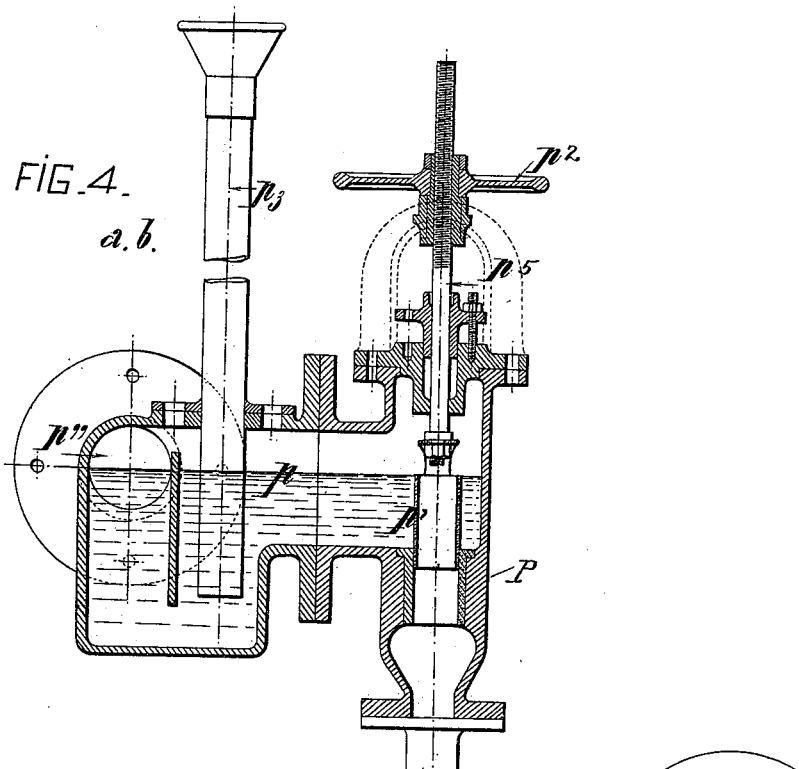
Figure 5:
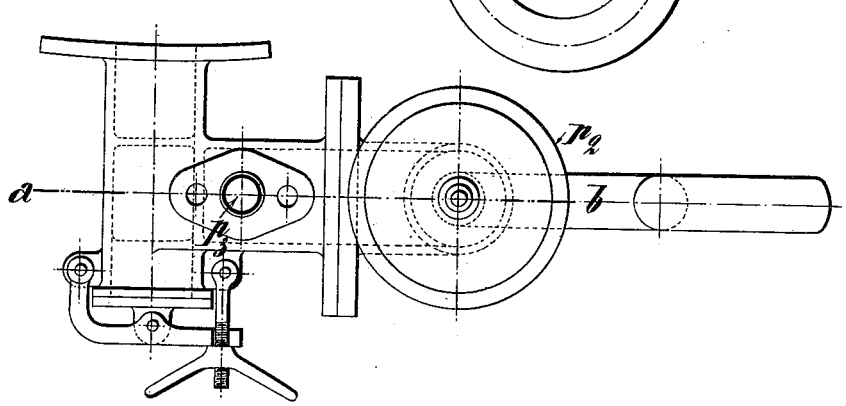
Figure 6:
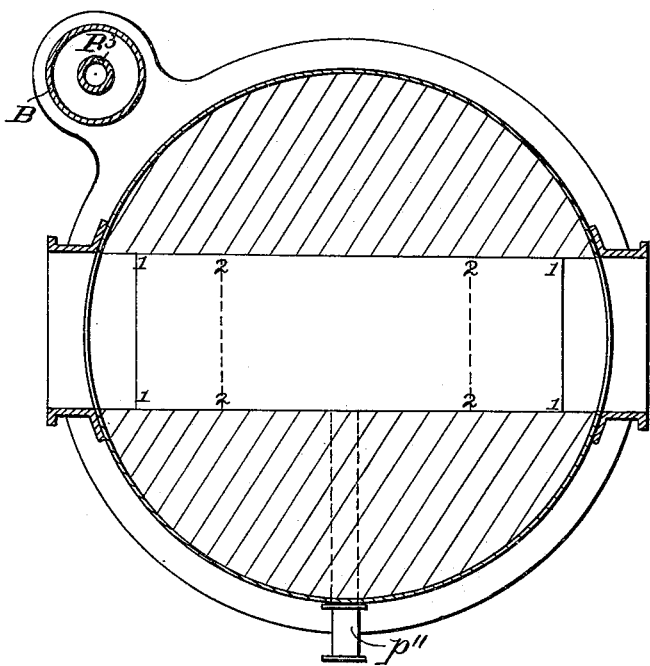

Figure 1 is a vertical sectional view through an apparatus embodying my invention. Fig. 2 is a similar view taken at right angles to Fig. 1. Fig. 3 is a horizontal sectional view on the line G H of Fig. 2. Fig. 4 is a vertical sectional view, and Fig. 5 is a top plan view, of the device for controlling the feed of water; and Fig. 6 is a horizontal sectional view through the apparatus just beneath the lower grate.

Referring to the drawings, A represents the main combustion-chamber, to which fuel is supplied through the hopper $d$ at the top thereof. The gases generated in this chamber leave the same by the passages $e$, with which the small passages $e'$ $e'$ communicate, the gases accumulating in the extreme upper end of the combustion-chamber entering said passages $e'$ through perforations $e^2$ in the sides thereof. From the conduit $e$ the gases pass to suitable condensing and purifying apparatus.

At the bottom of the combustion-chamber is located a flat grate $n$, supported at its ends upon bars $n'$ $n'$, which latter may be engaged in any one of a series of openings $n^2$ in supports K K and arranged one above another, whereby the grate $n$ may be arranged at any desired height. Stepped gratings I I are arranged opposite each other on two sides of the grating $n$, as clearly shown in Fig. 2, and above these gratings are located bars $m$ $m$, each having a passage $m'$ therethrough for purposes hereinafter described. Oppositely disposed on the other two sides of the grating $n$ are chambers $h$ $h$, interiorly ribbed, as clearly shown in Figs. 1 and 3, and each having a discharge-opening $k'$ at the lower end thereof.

Beneath the grates is a shallow water-reservoir, the bottom of which is formed by walls $w$ $w$, inclined upwardly from a central point at an obtuse angle, as clearly shown in Fig. 2. Water supplied to this reservoir is conducted through pipes $o$ $o$, Fig. 3, each connecting to one of the passages $m'$ $m'$ through bars $m$ $m$. Pipes $m^2$ $m^2$ lead from the other end of passages $m'$ $m'$ to the upright pipe $p^3$ of the water-feed-controlling device described hereinafter. From the foregoing it will be understood that the water in passing through passages $m'$ $m'$ will be thoroughly heated.

The device for controlling the feed of water to the reservoir (shown in Figs. 4 and 5) consists of a casing P, into which pipe $p^3$ leads and from which a passage $p''$ leads to the reservoir. $p^4$ is an overflow-pipe leading from casing P, and $p'$ is a valve or sluice at the inner end of pipe $p^4$, which permits the overflow of the water through said pipe, thereby maintaining a constant level in the casing P.

Sluice $p'$ may be raised or lowered by hand-wheel $p^2$ and screw $p^5$ to change the level of the water in casing P, and consequently in the reservoir. With such change of level of the water in the reservoir and casing P there is a corresponding change in the surface area thereof by reason of the inclination of walls $w\ w$. For example, when filled to the level of line 2 2, Fig. 2, the area of the evaporating-surface is indicated by the numerals 2 2 2 2, Fig. 6, while if filled to the higher level 1 1, Fig. 2, the evaporating-surface becomes much larger and is indicated by the numerals 1 1 1 1. It will be seen that a very small variation of the water-level by the adjustment of the sluice effects a considerable variation of the surface area of the water, and that therefore it is possible to regulate with exactness the saturation of the air with the water-vapor proportionately with its volume and independently of variations in pressure.

The air coming from any suitable blower arrives at the upper end of supply-regulator B by a pipe $b$ and then passes downwardly through pipe $B^3$, which dips at its lower end into water, filling the lower part of the regulator B. After passing the hydraulic joint thus formed, said joint acting to prevent the passage of gases from the furnace upwardly through pipe $B^3$ in the event of a considerable decrease in the pressure of air, the air passes through pipes $i\ i$, Fig. 3, into the upper ends of two chambers $h\ h$, located in the wall of the combustion-chamber.

The air heated in chambers $h\ h$ is discharged from the bottom thereof through openings $k'\ k'$ onto the surface of the water in the reservoir. It evaporates a certain quantity of water, according to the surface area thereof, and the mixture thus formed passes upwardly through the burning fuel and commingles with the gases of combustion which leave the generator through passage or conduit $e$.

Air in excess of that used in the production of the gas escapes through opening $b'$ in the upper end of regulator B, controlled by cone-valve $B'$, connected by a chain to lever $B^2$, which latter is adapted to be operated from a gasometer of any well-known construction wherein the gas generated accumulates. As the gasometer fills the cone-valve $B'$ is lowered, allowing more air to escape through opening $b'$, the quantity of air passing to the generator, and hence the amount of gas produced by the latter, being proportionately reduced. As the quantity of gas consumed increases, and hence the accumulation of gas in the gasometer decreases, the cone-valve closes the opening $b'$ and directs more air through pipe $i$, with a corresponding increase in the quantity of gas generated.

Having thus described my invention, what I claim as new, and desire to secure by Letters Patent, is—

1. In apparatus for generating gas, the combination with a combustion-chamber, of a water-reservoir under said chamber having inclined walls whereby the surface area of the water will vary in accordance with the height to which the reservoir is filled, means—such as an adjustable sluice—for controlling the feed of water to the reservoir whereby it may be maintained at a constant but adjustable level, and means for feeding air over the surface of the water in the reservoir and upwardly through the combustion-chamber.

2. In apparatus for generating gas, the combination with a combustion-chamber, of a water-reservoir under said chamber having inclined bottom walls whereby the surface area of the water will vary in accordance with the height to which the reservoir is filled, a water-conducting pipe or passage arranged contiguous to the combustion-chamber and wherein the water is preliminarily heated before it is delivered into the reservoir, an adjustable sluice for controlling the delivery of water from said passage into the reservoir and whereby it is maintained at a constant but adjustable level in the latter, and an air-conduit leading to compartments in the wall of the combustion-chamber wherein the air is preliminarily heated before passing over the surface of the water and upwardly through the burning fuel.

3. In apparatus for generating gas, the combination with a combustion-chamber, of a water-reservoir under said chamber having inclined bottom walls whereby the surface area of the water will vary in accordance with the height to which the reservoir is filled, a water-conducting pipe or passage arranged contiguous to the combustion-chamber wherein the water is preliminarily heated before it is delivered into the reservoir, an adjustable sluice for controlling the feed of water from said passage into the reservoir and whereby it is maintained at a constant but adjustable level in the latter, an air-conduit leading to the compartments in the wall of the combustion-chamber wherein the air is preliminarily heated before passing over the surface of the water and upwardly through the burning fuel, and a valve for regulating the quantity of air passing through the air-conduit.

In testimony whereof I have signed this specification in the presence of two subscribing witnesses.

JAMES ALEXANDRE BELLON-LENCAUCHEZ.

Witnesses:
    EDWARD P. MACLEAN,
    ANTOINE ROURSANNERT.